(12) United States Patent
Inoue

(10) Patent No.: US 10,084,950 B2
(45) Date of Patent: Sep. 25, 2018

(54) IMAGE CAPTURING APPARATUS

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 41 days.

(21) Appl. No.: 15/214,860

(22) Filed: Jul. 20, 2016

(65) Prior Publication Data
US 2017/0034423 A1 Feb. 2, 2017

(30) Foreign Application Priority Data
Jul. 27, 2015 (JP) .................. 2015-147640

(51) Int. Cl.
| H04N 5/225 | (2006.01) |
| H04N 5/232 | (2006.01) |
| H04N 5/235 | (2006.01) |
| H04N 13/00 | (2018.01) |
| H04N 13/239 | (2018.01) |
| H04N 13/243 | (2018.01) |
| H04N 13/106 | (2018.01) |

(52) U.S. Cl.
CPC ....... *H04N 5/2258* (2013.01); *H04N 5/23229* (2013.01); *H04N 13/106* (2018.05); *H04N 13/239* (2018.05); *H04N 13/243* (2018.05); *H04N 5/2355* (2013.01); *H04N 5/23245* (2013.01); *H04N 2013/0081* (2013.01)

(58) Field of Classification Search
CPC ............ H04N 5/2258; H04N 5/23229; H04N 13/0242; H04N 13/0239
See application file for complete search history.

(56) References Cited

U.S. PATENT DOCUMENTS

| 6,512,892 B1 * | 1/2003 | Montgomery ..... H04N 13/0011 348/E13.008 |
| 7,561,191 B2 * | 7/2009 | May ..................... H04N 5/2254 348/240.2 |
| 8,749,652 B2 | 6/2014 | Fan |

(Continued)

FOREIGN PATENT DOCUMENTS

| JP | 2009047495 A | 3/2009 |
| JP | 2011176460 A | 9/2011 |

(Continued)

*Primary Examiner* — Daniel M Pasiewicz
(74) *Attorney, Agent, or Firm* — Rossi, Kimms & McDowell LLP

(57) ABSTRACT

The image capturing apparatus includes a main image capturing system configured to capture an object image formed by a main optical system whose magnification is variable, and multiple sub image capturing systems configured to respectively capture multiple object images respectively formed by multiple sub optical systems. The multiple optical systems are arranged on both sides across a sectional plane including an optical axis of the main optical system. The apparatus further includes a processor configured to acquire, using a main image produced by the main image capturing system and multiple sub images produced by the multiple image capturing systems, object distance information in an image capturing view angle of the main image capturing system.

8 Claims, 12 Drawing Sheets

(56) References Cited

U.S. PATENT DOCUMENTS

| | | | |
|---|---|---|---|
| 9,451,171 B2* | 9/2016 | Laroia | G02B 13/02 |
| 9,565,416 B1* | 2/2017 | Lewkow | H04N 5/23212 |
| 2008/0030592 A1* | 2/2008 | Border | H04N 5/232 |
| | | | 348/218.1 |
| 2011/0050893 A1* | 3/2011 | Lee | G01B 11/245 |
| | | | 348/137 |
| 2012/0050587 A1 | 3/2012 | Yamamoto | |
| 2012/0188420 A1* | 7/2012 | Black | H04N 5/2253 |
| | | | 348/279 |
| 2012/0293633 A1* | 11/2012 | Yamato | G01C 11/06 |
| | | | 348/47 |
| 2013/0223759 A1* | 8/2013 | Nishiyama | G06T 5/50 |
| | | | 382/284 |
| 2014/0043445 A1* | 2/2014 | Zhang | H04N 13/0242 |
| | | | 348/48 |
| 2015/0092023 A1* | 4/2015 | Asakura | H04N 13/0217 |
| | | | 348/49 |
| 2015/0281538 A1* | 10/2015 | Boettiger | H04N 5/2258 |
| | | | 348/218.1 |
| 2016/0073083 A1* | 3/2016 | Hagiwara | H04N 13/0011 |
| | | | 382/232 |
| 2016/0373626 A1* | 12/2016 | Stetson | H04N 5/2258 |
| 2017/0094222 A1* | 3/2017 | Tangeland | H04N 5/2252 |
| 2017/0223261 A1* | 8/2017 | Shimizu | H04N 5/23212 |

FOREIGN PATENT DOCUMENTS

| | | |
|---|---|---|
| JP | 2012049651 A | 3/2012 |
| JP | 2012247356 A | 12/2012 |
| JP | 2013061560 A | 4/2013 |

* cited by examiner

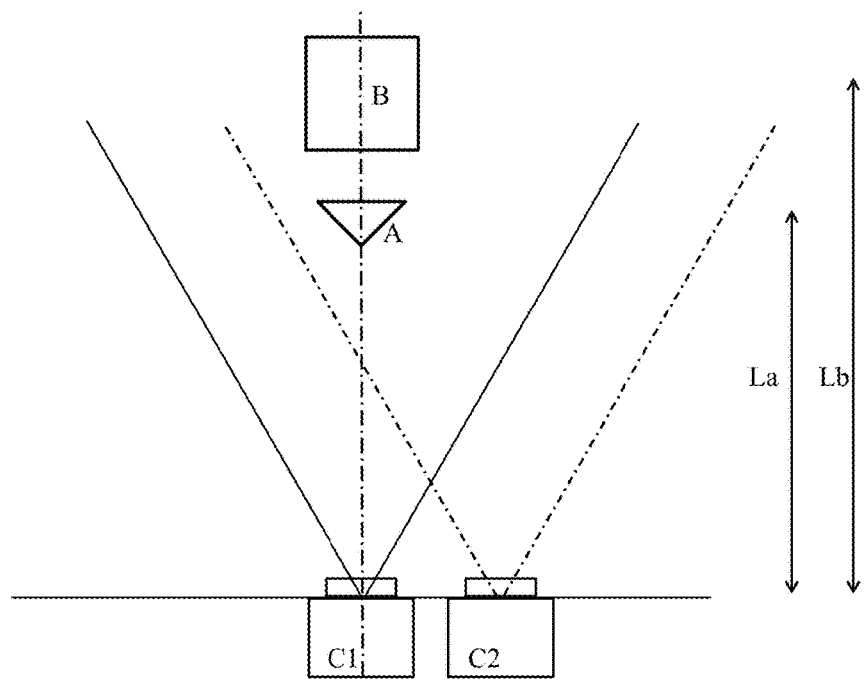
FIG. 13
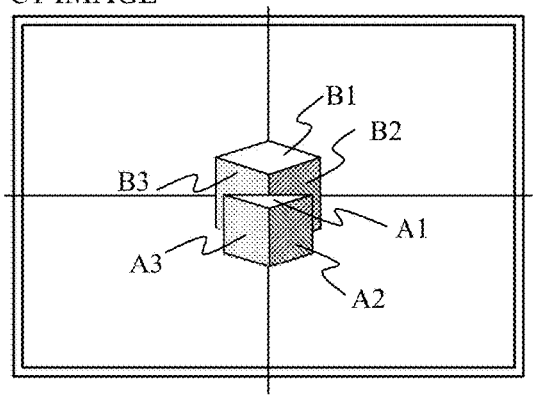 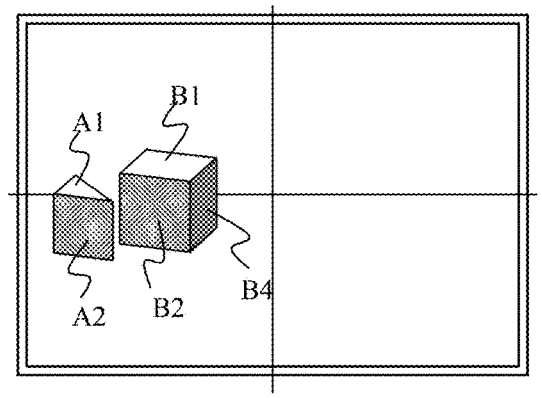
FIG. 14A          FIG. 14B

IMAGE CAPTURING APPARATUS

BACKGROUND OF THE INVENTION

Field of the Invention

The present invention relates to an image capturing apparatus having a main image capturing system and a sub image capturing system.

Description of the Related Art

Image capturing apparatuses such as video cameras and digital cameras are proposed, each of which has, in addition to a main image capturing system for acquiring a normal captured image, a sub image capturing system. Japanese Patent Laid-Open No. 2012-049651 discloses an image capturing apparatus that has, in addition to a main image capturing system including a zoom lens, a sub image capturing system including a fixed focal length lens having a wide view angle. This image capturing apparatus acquires a wider view angle captured image by the sub image capturing system than that acquirable by the main image capturing system to facilitate following a moving object. Japanese Patent Laid-Open No. 2012-049651 further discloses a method for acquiring information on an object distance, using the captured images acquired by the main and sub image capturing systems.

Furthermore, Japanese Patent Laid-Open No. 2013-061560 discloses an image capturing apparatus having, in addition to a main image capturing system having a zoom lens, multiple stereo cameras as sub image capturing systems having mutually different focal lengths.

This image capturing apparatus acquires object distance information from parallax information provided by the stereo cameras and performs AF (autofocus) of the main image capturing system using the object distance information.

However, in the image capturing apparatuses disclosed in Japanese Patent Laid-Open Nos. 2012-049651 and 2013-061560, a viewpoint position of the sub image capturing system is different from that of the main image capturing system, which generates in the captured image acquired by the sub image capturing system an object area (occlusion area) not included in the captured image acquired by the main image capturing system. It is generally difficult to acquire the parallax information in the occlusion area. Therefore, the captured image acquired by the main image capturing system includes an area where the object distance information cannot be acquired from the parallax information acquired using the sub image capturing system.

SUMMARY OF THE INVENTION

The present invention provides an image capturing apparatus capable of avoiding, over an entire image capturing view angle of a main image capturing system, problems such as impossibility of acquiring object distance information due to generation of an occlusion area in a sub image capturing system.

The present invention provides as an aspect thereof an image capturing apparatus including a main image capturing system configured to capture an object image formed by a main optical system whose magnification is variable, and multiple sub image capturing systems configured to respectively capture multiple object images respectively formed by multiple sub optical systems. The multiple optical systems are arranged on both sides across a sectional plane including an optical axis of the main optical system. The apparatus further includes a processor configured to acquire, using a main image produced by the main image capturing system and multiple sub images produced by the multiple image capturing systems, object distance information in an image capturing view angle of the main image capturing system.

Further features and aspects of the present invention will become apparent from the following description of exemplary embodiments with reference to the attached drawings.

BRIEF DESCRIPTION OF THE DRAWINGS

FIG. 13 illustrates image capture from different viewpoint positions.

FIGS. 14A and 14B illustrate occlusion areas.

DESCRIPTION OF THE EMBODIMENTS

Exemplary embodiments of the present invention will be described below with reference to the accompanied drawings.

First, description will be made of features common to the embodiments before specific descriptions thereof. An image capturing apparatus of each embodiment has a main image capturing system configured to capture an object image formed by a main optical system whose magnification is variable and multiple image capturing systems configured to capture multiple object images respectively formed by multiple sub optical systems. The image capturing apparatus acquires from the main image capturing system a main image as a captured image and acquires from the multiple sub image capturing system multiple sub images as captured images. Using these main and multiple sub images enables avoiding, over an entire image capturing view angle of the main image capturing system, problems such as impossibility of acquiring object distance information due to generation of an occlusion area resulted from a difference between viewpoint positions of the main and sub optical systems, that is, enables acquiring accurate object distance information over the entire image capturing view angle of the main image capturing system.

Description will be made of the occlusion area generated due to the difference of the viewpoint positions with referring to FIGS. 13, 14A and 14B. FIG. 13 illustrates objects A and B and two image capturing apparatuses C1 and C2 capturing the objects A and B. The image capturing apparatuses C1 and C2 are separate from each other by a base length. The object A is separate from the image capturing apparatuses C1 and C2 by an object distance La, and the object B is separate from the image capturing apparatuses C1 and C2 by an object distance Lb (>La). FIGS. 14A and 14B illustrate captured image respectively acquired by the image capturing apparatuses C1 and C2. As understood from these drawings, a geometric relation depending on the base length and the object distances, the captured images include mutually different areas of the objects A and B. For example, the captured image illustrated in FIG. 14A, which is acquired by the image capturing apparatus C1, includes a surface A3 of the object A and a surface B3 of the object B. However, the captured image illustrated in FIG. 14B, which is acquired by the image capturing apparatus C2, does not include the surfaces A3 and B3. On the other hand, the captured image is illustrated in FIG. 14B includes a surface B4 of the object B not included in the captured image illustrated in FIG. 14A. As just described, an area included in one of captured images acquired by image capture from mutually different viewpoint positions but not included in the other captured image is referred to as "the occlusion area".

Figure 15:
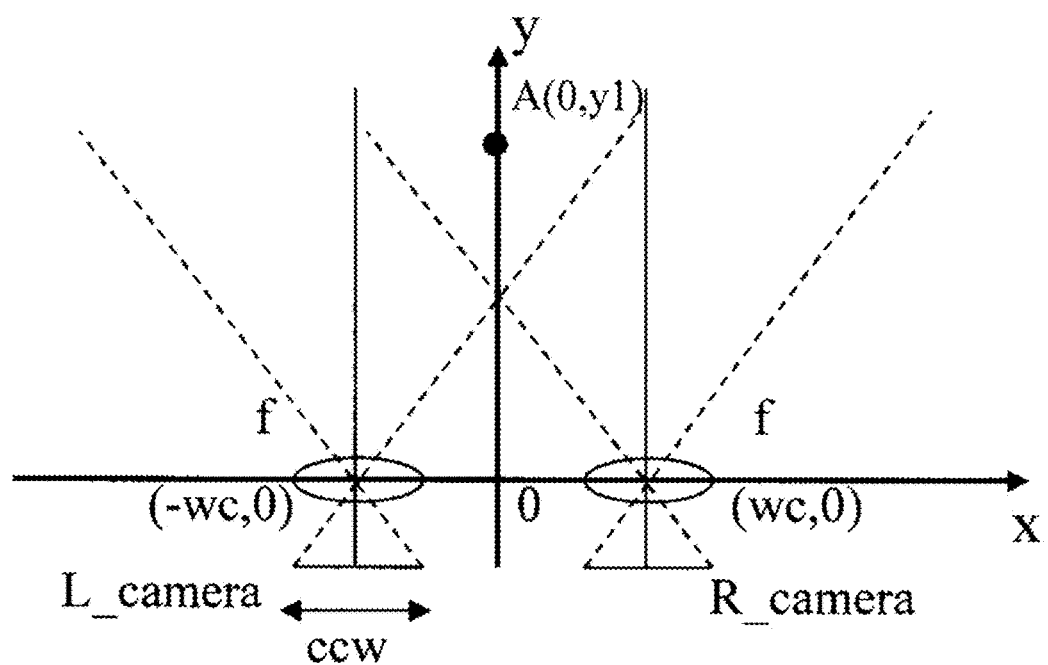
FIG. 15 illustrates a model of stereo image capturing method.

Next, description will be made of a method for calculating an object distance using parallax images acquired by image capture from mutually different viewpoint positions with referring to FIG. 15. FIG. 15 illustrates a model of stereo image capturing method. Coordinates (x,y) are based on an origin that is a center between a left camera L_camera and a right camera R_camera. A position in a horizontal direction is expressed by an x-coordinate along an x-axis, and a position in a depth direction is expressed by a y-coordinate along a y-axis. A coordinate in a height direction is omitted.

In this description, principal points of imaging optical systems of the left camera L_camera and the right camera R_camera are located at (−Wc,0) and (Wc,0), respectively. A focal length of each of these cameras L_camera and R_camera is represented by f. The left and right cameras L_camera and R_camera capture an object A located at coordinates (0,y1) on the y-axis. Displacement amounts (in other words, parallax amounts) of optical images (object images) of the object A from centers of image sensors of the left and right cameras L_camera and R_camera are expressed by following expressions (1) and (2).

$$Plc = -\frac{wc}{y1} \cdot f \quad (1)$$

$$Prc = \frac{wc}{y1} \cdot f \quad (2)$$

Namely, image capture of an identical object from mutually different viewpoint positions enables acquiring left and right parallax images including displacement amounts (parallax amounts) Plc and Prc expressed by above expressions (1) and (2) in a viewpoint separation direction (base length direction). An object distance y1 to the object A can be calculated using these displacement amounts Plc and Prc by following expression (3).

$$y1 = \frac{2wc}{Prc - Plc} \cdot f \quad (3)$$

As described above, in order to calculate the object distance using the parallax images, it is necessary to specify object areas corresponding to each other (that is, object areas including an identical object) in the parallax images. As a method for specifying such corresponding object areas in two images, a corresponding point extraction method such as a block matching method, which will be described later, can be used.

In the following description, the image capturing apparatus C1 as illustrated in FIG. 13 is defined as a main image capturing system, and the image capturing apparatus C2 is defined as a sub image capturing system. As described above, the captured image (FIG. 14A) acquired by the main image capturing system C1 includes the surface A3 of the object A and the surface B3 of the object B. However, the captured image (FIG. 14B) acquired by the sub image capturing system C2 does not include these surfaces A3 and B3. In other words, the captured image acquired by the sub image capturing system C2 does not include object areas corresponding to the surface A3 of the object A and the surface B3 of the object B that are included in the captured image acquired by the main image capturing system C1. Therefore, is impossible to calculate the above-described displacement amounts of the object images. Namely, a problem occurs that object distances of the object areas, in the captured image acquired by the main image capturing system C1, respectively including the surface A3 of the object A and the surface B3 of the object B cannot be calculated.

A substantial problem does not occur if such an object area where the object distance cannot be calculated is included in the captured image acquired by the sub image capturing system C2. However, the object area where the object distance cannot be calculated in the captured image acquired by the main image capturing system C1 causes problems such as impossibility of performing AF control for that area using information on the object distance.

Thus, in order to solve the problems, each embodiment appropriately arranges the multiple sub optical systems included in the multiple sub image capturing systems.

Embodiment 1

Figure 1:
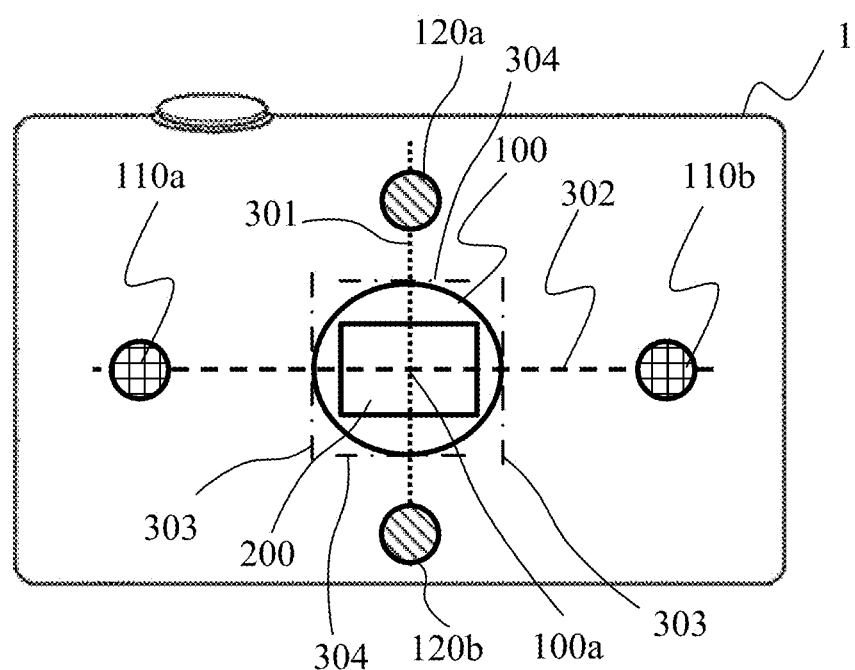
FIG. 1 is a front view of an image capturing apparatus that is Embodiment 1 of the present invention.

FIG. 1 illustrates an image capturing apparatus 1 that is a first embodiment (Embodiment 1) of the present invention, which is viewed from an object side. A main optical system 100 as an imaging optical system whose magnification is variable has a variable focal length (35 mm-equivalent focal length) from 24 mm to 300 mm. A main image sensor 200 has a rectangular image capturing area corresponding to the main optical system 100 and captures (photoelectrically converts) an object image formed by the main optical system 100. The main optical system 100 and the main image sensor 200 constitute a main image capturing system.

Four sub optical systems 110a, 110b, 120a and 120b are each a fixed focal length imaging optical system. Four sub image sensors (not illustrated) capture (photoelectrically convert) object images respectively formed by the four sub optical systems 110a, 110b, 120a and 120b. Each sub optical system and the sub image sensor corresponding thereto constitute a sub image capturing system. That is, the mage capturing apparatus 1 of this embodiment has four sub image capturing systems. The four sub image capturing systems includes two first sub image capturing systems respectively constituted by the sub optical systems 110a and 110b and the sub image sensors corresponding thereto and two second sub image capturing systems respectively constituted by the sub optical systems 120a and 120b and the sub image sensors corresponding thereto.

The main optical system 100 and the four sub optical systems 110a, 110b, 120a and 120b are arranged such that optical axes thereof are parallel to one another. The sub optical systems (each hereinafter referred to as "a first sub optical system") 110a and 110b are each a fixed focal length optical system having a focal length equal to a 35 mm-equivalent focal length of 24 mm (that is, having a view angle equal to that) of the main optical system 100 at its wide-angle end. On the other hand, the sub optical systems (each hereinafter referred to as "a second sub optical system") 120a and 120b are each a fixed focal length optical system having a focal length equal to a middle focal length of the main optical system 100 at its middle zoom position between its wide-angle end and telephoto end. That is, each of the second sub optical systems 120a and 120b has a view angle narrower than that of the main optical system 100 at the wide-angle end and wider than that of the main optical system 100 at the telephoto end. For example, each of the second sub optical systems 120a and 120b has a 35 mm-equivalent focal length of 150 mm.

The first sub optical systems 110a and 110b are arranged on both sides across a sectional plane (straight line) 301 including the optical axis 100a of the main optical system 100 and in areas further outside than the main optical system 100 (that is, further outside than two lines 303) in a horizontal direction orthogonal to the sectional plane 301.

The sectional plane 301 includes midpoints of two long sides of the rectangular image capturing area of the main image sensor 200 and the optical axis 100a of the main optical system 100. Arranging the first sub optical systems 110a and 110b as described above enables avoiding generation of the above-described occlusion area over an entire horizontal area of a captured image acquired through the main optical system 100 (that is, over an entire horizontal image capturing view angle of the main image capturing system).

The second sub optical systems 120a and 120b are arranged on both sides across a sectional plane (straight line) 302 including the optical axis 100a of the main optical system 100 and in areas further outside than the main optical system 100 (that is, further outside than two lines 304) in a vertical direction orthogonal to the sectional plane 302.

The sectional plane 302 includes midpoints of two short sides of the rectangular image capturing area of the main image sensor 200 and the optical axis 100a of the main optical system 100. Arranging the second sub optical systems 120a and 120b as described above enables avoiding generation of the above-described occlusion area over an entire vertical area of the captured image acquired through the main optical system 100 (that is, over an entire vertical image capturing view angle of the main image capturing system).

Avoiding the generation of the occlusion area enables successfully performing an image combination process and an object distance calculation process, which are described later, in the image capturing view angle of the main image capturing system.

Figure 3C:
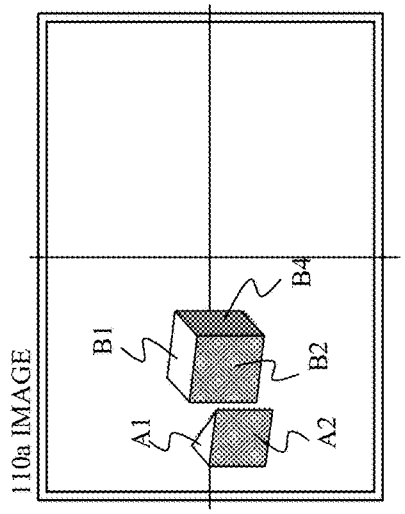
FIGS. 3A to 3C illustrate captured images acquired by the image capturing apparatus of Embodiment 1.
Figure 3B:
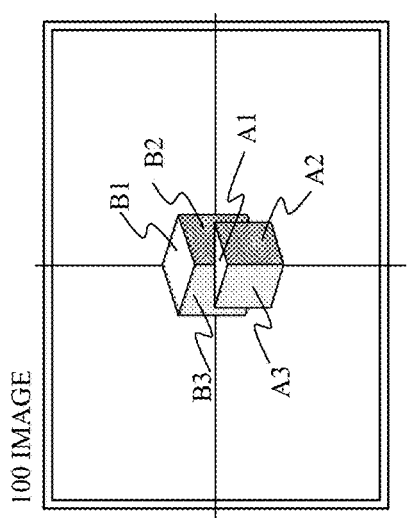
Figure 3A:
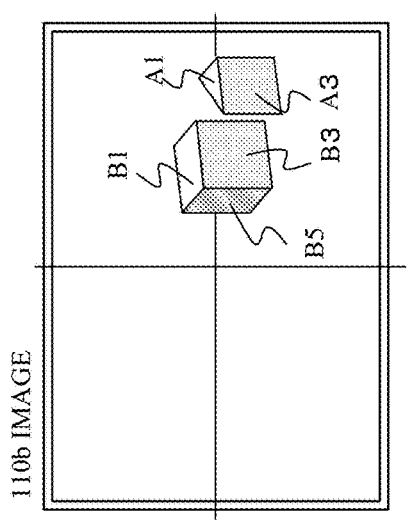

Next, description will be made of the principal of elimination of the occlusion area over the entire image capturing view angle of the main image capturing system by using captured images acquired by the main and sub image capturing systems. FIG. 3B illustrates a captured image (hereinafter referred to as "a main image") acquired by image capture of the objects A and B, which are illustrated in FIG. 13, through the main image capturing system having the image capturing view angle at the wide-angle end. FIGS. 3A and 3C respectively illustrate two captured images (each hereinafter referred to as "a sub image") acquired by image capture of the objects A and B through one first sub image capturing system (sub optical system 110b) and the other first sub image capturing system (sub optical system 110a). Each of these main and sub images includes, due to the difference of viewpoint positions as described with referring to FIGS. 14A and 14B, a captured (included) part and a non-captured (non-included) part of an identical object.

However, surfaces A1 and B1 included in the main image as a base image illustrated in FIG. 3B are included in both the two sub images illustrated in FIGS. 3A and 3C. On the other hand, surfaces A2 and B3 included in the main image are included in the sub image illustrated in FIG. 3C, and the surfaces A3 and B3 are included in the sub image illustrated in FIG. 3A. Namely, all surfaces of the objects A and B included in the main image are included in at least one of the two sub images.

As described above, arranging the first sub optical systems 110a and 110b on the both sides across the sectional plane 301 (and in the areas further horizontally outside than the main optical system 100) enables eliminating the occlusion area over the entire horizontal image capturing view angle of the main image capturing system. Similarly, arranging the second sub optical systems 120a and 120b on the both sides across the sectional plane 302 (and in the areas further vertically outside than the main optical system 100) enables eliminating the occlusion area over the entire vertical image capturing view angle of the main image capturing system.

FIG. 1 illustrates a most typical arrangement example of the main optical system 100 and the sub optical systems 110a, 110b, 120a and 120b. The optical axes of the first sub optical systems 110a and 110b and the optical axis 100a of the main optical system 100 are located on the identical straight line 302. Furthermore, the optical axes of the second sub optical systems 120a and 120b and the optical axis 100a of the main optical system 100 are located on the identical straight line 301. However, it is not necessarily needed that the main and sub optical systems be located on such an identical straight line. In other words, as long as the sub image optical systems are arranged on the both sides across the sectional plane including the optical axis 100a of the main optical system 100 and thereby the occlusion area is eliminated over the entire vertical image capturing view angle of the main image capturing system, it is not needed that the main and sub optical systems be located on an identical straight line.

Figure 2:
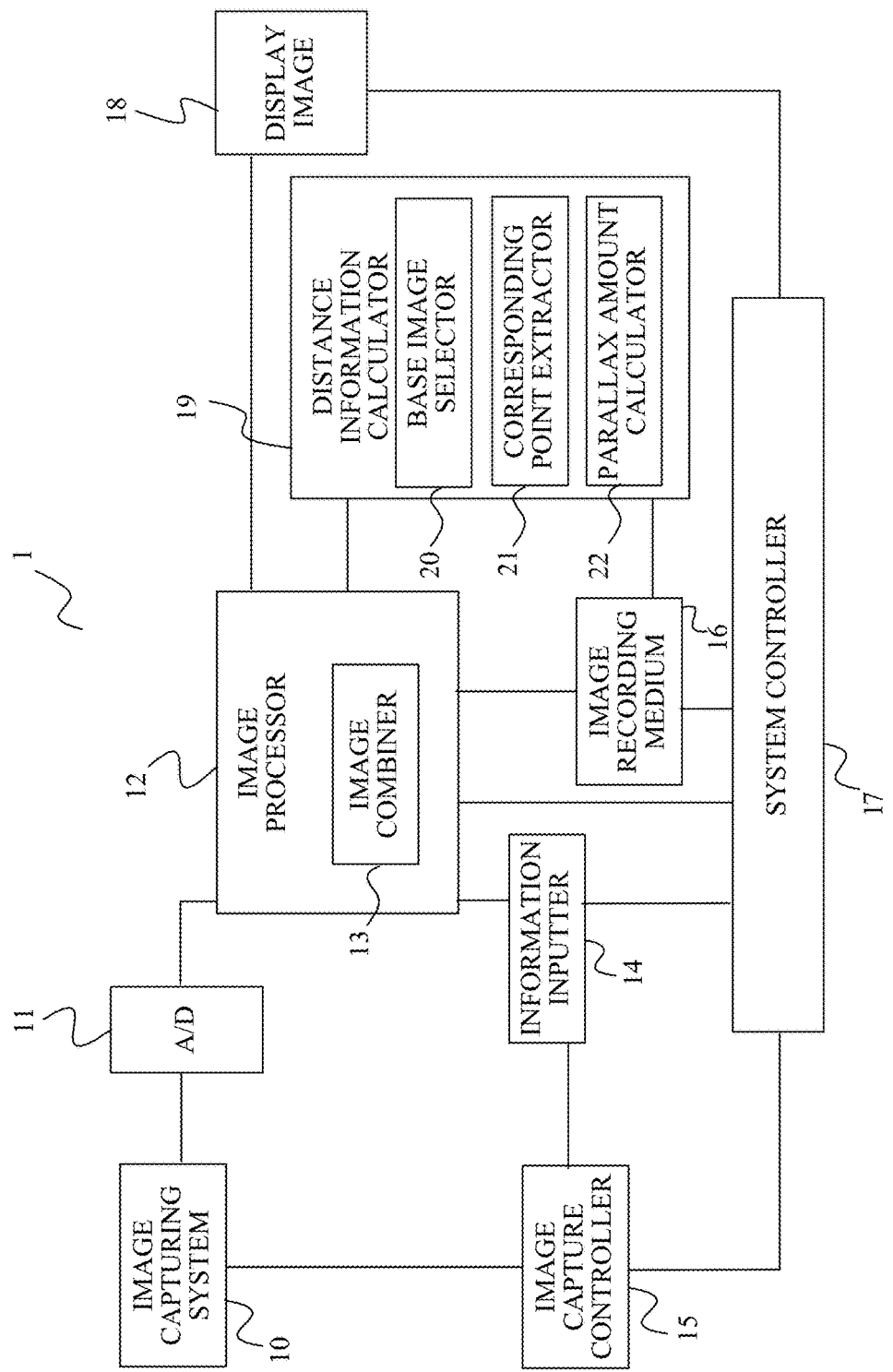
FIG. 2 is a block diagram illustrating a configuration of the image capturing apparatus of Embodiment 1.

FIG. 2 illustrates an electrical configuration of the image capturing apparatus 1 of this embodiment. The image capturing apparatus 1 includes an image capturing system constituted by the one main image capturing system and the four sub image capturing systems, an A/D converter 11, an image processor 12, an image combiner 13, an information inputter 14, an image capture controller 15, an image recording medium 16, a system controller 17, a display device 18 and a distance information calculator 19. The A/D converter 11 converts analog image capturing signals output from the main image sensor 200 and the four sub image sensors (not illustrated) into digital image capturing signals to supply the converted digital image signals to the image processor 12. The image processor 12 performs on the digital image signals from the A/D converter 11 a pixel interpolation process, a color conversion process, a digital zoom process and others to produce captured images (one main image and four sub images). Furthermore, the image processor 12 performs various calculation processes using the captured images to send calculation results to the system controller 17. The image processor 12 further includes the image combiner 13. The image combiner 13 sets the main image acquired by the main image capturing system, which serves as a base viewpoint, to a base image for image combination and combines at least two of the four sub images acquired by the four sub image capturing systems with the base image. The image combination uses the block matching method describe later.

The information inputter 14 detects information on an image capturing condition (such as an aperture value and an exposure time) selected and input by a user to supply data thereof to the system controller 17. The image capture controller 15 controls, depending on commands from the system controller 17, a movement of a focus lens included in each optical system, an aperture stop (aperture value) in each optical system and a photoelectric conversion operation (exposure time) of the image sensor of each image capturing system. The image recording medium 16 records the captured images produced by the image processor 12 and a file header of an image file containing the captured images. The display device 18 temporarily displays a preview image of the captured image immediately after image capture and displays the recorded captured images. The display device 18 further displays selectable menu items and a selectable focal length (view angle) range. The display device 18 is constituted by a liquid crystal display device or the like.

The distance information calculator 19 includes a base image selector 20, a corresponding point extractor 21 and a parallax amount calculator 22. The base image selector 20 selects the main image acquired by the main image capturing system as a base image for object distance information calculation. The corresponding point extractor 21 extracts pixels (hereinafter referred to as "corresponding points") corresponding to each other from paired ones of the main image and four sub images. The parallax amount calculator 22 calculates parallax amounts of all the corresponding points extracted by the corresponding point extractor 21. The distance information calculator 19 calculates, using the calculated parallax amounts, object distances in the entire main image (that is. in the entire image capturing view angle of the main image capturing system).

Next, description will be made of an image capture/image combination process performed by the system controller 17 and the image processor 12 (image combiner 13) with referring to a flowchart of FIG. 4. The system controller 17 and the image processor 12 each constituted by a computer execute the image capture/image combination process according to an image capture/image combination program as a computer program. In the following description, a step is abbreviated as "S". The system controller 17 serves as a selector, and the image processor 12 serves as a processor.

First, at S100, the system controller 17 acquires the information on the image capturing condition and others input by the user through the information inputter 14. In response to input of an image capture instruction from an image capture start switch (not illustrated) operated by the user, the system controller 17 transfers the information on the image capturing condition and others to the image capture controller 15. The image capturing condition includes the image capturing view angle, the aperture value, the exposure time (shutter speed) and others of the main image capturing system. The image capture controller 15 controls, depending on the input image capturing condition, the image capturing view angle (zoom state) of the main image capturing system, the aperture values and the shutter speeds of the main and sub image capturing systems and others.

Next, at S101, the system controller 17 selects, depending on the input image capturing condition, the first sub image capturing systems or the second sub image capturing systems as the sub image capturing systems to be used for image capture. The selection of the sub image capturing systems depends on the information on the image capturing view angle set for the main image capturing system (hereinafter referred to as "a main image capturing view angle"). The system controller 17 performs image combination on the entire main image acquired by the main image capturing system and therefore selects the sub image capturing systems whose image capturing view angle (hereinafter referred to as "a sub image capturing view angle") is equal to or wider than that of the main image capturing view angle.

Next, at S102, the system controller 17 causes, through the image capture controller 15, the main image capturing system and the sub image capturing systems selected at S101 to perform image capture (exposure of the main and sub image sensors) and causes the image processor 12 to produce captured images. Thereby, one main image and two sub images are acquired as parallax images mutually having parallaxes. In producing each image, the image processor 12 may correct a brightness level and a white balance of each image, which enables reducing brightness unevenness and color unevenness of a combined image produced by the image combination performed later.

Next, at S103, the system controller 17 determines whether or not the main image capturing view angle is equal to the sub image capturing view angle of the selected sub image capturing systems. If the main image capturing view angle is equal to the sub image capturing view angle, the system controller 17 proceeds to S104, and otherwise proceeds to S105.

At S104, the system controller 17 causes the image processor 12 to combine the sub images corresponding to the image capturing view angle equal to that of the main image with the main image as the base image for the image combination.

Next, description will be made of a method for combining the main and sub images performed by the image processor 12. Description herein will be made of a case where the main image capturing view angle is set to its wide-angle end. In this embodiment, the image processor 12 uses the main image (FIG. 3B) as the base image and extracts, from the sub images (FIGS. 3A and 3C) as reference images acquired by the first sub image capturing systems (first sub optical systems 110a and 110b), object areas corresponding to an object area included in the base image to combine the extracted object areas with the base images.

First, description will be made of a method for extracting, from the sub image (reference image), the object area (corresponding point) corresponding to the object area included in the main image (base image), with reference to FIGS. 5A and 5B.

Figure 5A:
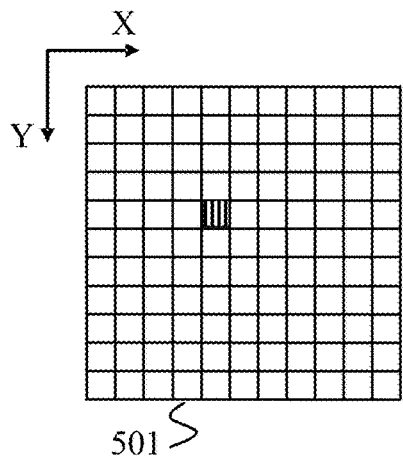
FIGS. 5A and 5B illustrate a method for extracting corresponding points.
Figure 5B:
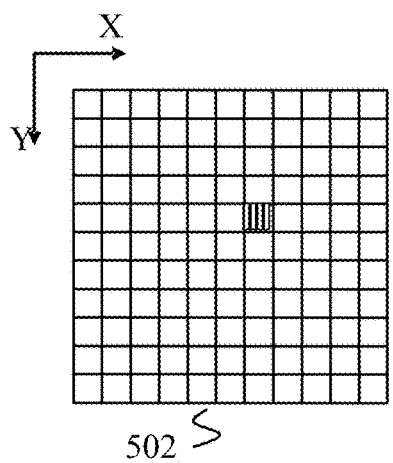

FIG. 5A illustrates the base image 501 that is the main image illustrated in FIG. 3B, and FIG. 5B illustrates the reference image 502 that is the sub image illustrated in FIG. 3A acquired through the sub optical system 110b. The following description uses image coordinates (X,Y) indicating horizontal and vertical positions (pixel) in each image. The image coordinates (X,Y) are based on an origin located at an upper left position in the images illustrated in FIGS. 5A and 5B. In addition, in the following description, F1(X,Y) represents a brightness value of a pixel (X,Y) in the base image 501, and F2(X,Y) represents a brightness value of a pixel (X,Y) in the reference image 502.

A pixel (hatched) in the reference image 502 corresponding to an arbitrary pixel (hatched) (X,Y) in the base image 501 is determined by searching in the reference image 502 for a brightness value most similar to F1(X,Y) in the base image 501. However, it is difficult to simply search for a pixel (corresponding point; hereinafter referred to as "a corresponding pixel") whose brightness value is most similar to that of the arbitrary pixel, so that a block matching method using pixels near the pixel (X,Y) is employed to search for the corresponding pixel.

For example, description will be made of the block matching method in a case where a block size is 3.

In the base image 501, three pixels including an arbitrary pixel (X,Y) and its left and right pixels (X−1,Y) and (X+1,Y) respectively have brightness values F1(X,Y), F1(X−1,Y) and F1(X+1,Y). On the other hand, in the reference image 502, three pixels shifted by k from the coordinates (X,Y), (X−1,Y) and (X+1,Y) respectively have brightness values F2(X+k,Y), F2(X+k−1,Y) and F2(X+k+1,Y). A similarity E to the pixel (X,Y) in the base image 501 is defined by following expression (4).

$$E = [F1(X, Y) - F2(X + k, Y)] + [F1(X - 1, Y) - F2(X + k - 1, Y)] + [F1(X + 1, Y) - F2(X + k + 1, Y)] = \sum_{j=-1}^{1} [F1(X + j, Y) - F2(X + k + j, Y)] \quad (4)$$

Calculating the similarities E while sequentially changing the value of k in above expression (4) provides a pixel (X+k,Y) whose similarity E is smallest. This pixel (X+k,Y) is the corresponding pixel in the reference image 502 that corresponds to the pixel (X,Y) in the base image 501. Although the above description was made of the method for the corresponding point extraction between the images having a parallax in the horizontal direction, a similar method can be used for corresponding point extraction between images having a parallax in the vertical direction or an oblique direction.

Combining the object area as the corresponding point thus acquired with the base image pixel by pixel enables reducing a noise level in the base image and improving an image quality of an output combined image. The sub image illustrated in FIG. 3C acquired through the sub optical system 110a does not include object areas corresponding to the surfaces A3 and B3 in the main image illustrated in FIG. 3B, so that these surfaces A3 and B3 are not combined from the sub image acquired through the sub optical system 110a with the base image. Furthermore, the sub image illustrated in FIG. 3A acquired through the sub optical system 110b does not include object areas corresponding to the surfaces A2 and B2 in the main image illustrated in FIG. 3B, so that these surfaces A2 and B2 are not combined from the sub image acquired through the sub optical system 110b with the base image. Such occlusion areas cannot be combined from the sub images. However, most of other areas than the occlusion areas can be combined from the sub images acquired by image capture from different viewpoint positions with the main image, which enables reducing the noise level of the combined image as a whole.

In a case where the parallax between the base and reference images is too large and shapes thereof are too different from each other to use the block matching method, an affine transform or the like may be performed on the reference image, and thereafter the image combination may be performed using the block matching method.

A similar method to the above-described image combination method can combine the sub image acquired by the second sub image capturing systems (sub optical systems 120a and 120b) with the main image.

The system controller 17 proceeding from S103 to S105, because the sub image capturing view angle is different from the main image capturing view angle, performs a trimming/enlargement process on a partial image area in the sub image (reference image) such that the enlarged partial image area becomes an image corresponding to the main image capturing view angle. In this description, the main image capturing view angle corresponds to a 35 mm-equivalent focal length of 50 mm.

Figure 6A:
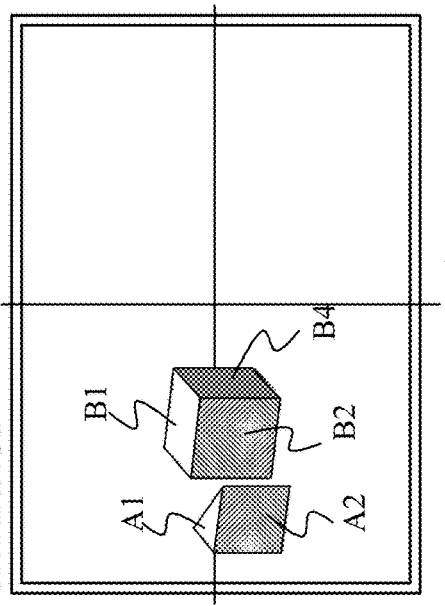
FIGS. 6A to 6D illustrate a trimming/enlargement process in Embodiment 1.
Figure 6B:
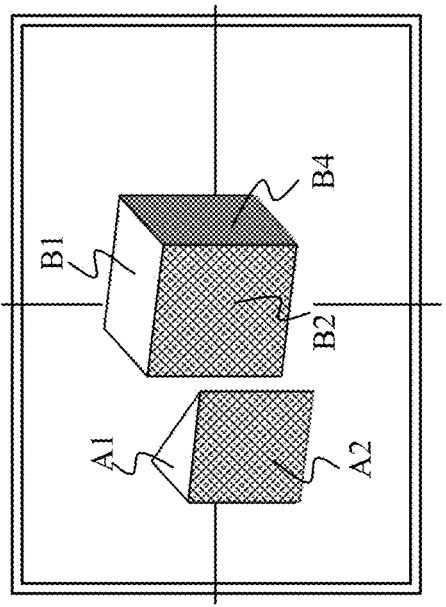
Figure 6C:
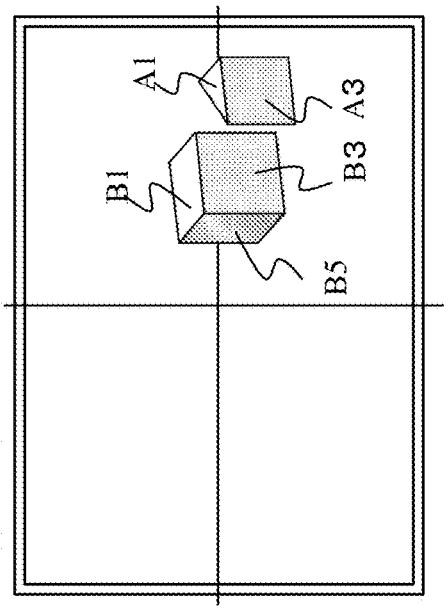
Figure 6D:
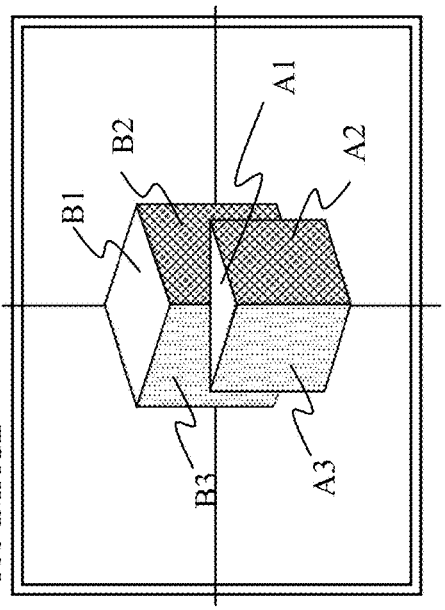

FIGS. 6A and 6B illustrate sub images acquired by image capture of the objects A and B illustrated in FIG. 13 through the first sub image capturing systems (first sub optical systems 110b and 110a). Furthermore, FIG. 6C illustrates a main image acquired by image capture of the objects A and B through the main image capturing system (main optical system 100). Moreover, FIG. 6D illustrates an image (hereinafter referred to as "an enlarged image") acquired by trimming and enlarging a partial image area including the objects A and B in the sub image illustrated in FIG. 6B such that the enlarged image corresponds to the main image capturing view angle. Although not illustrated, a partial image area including the objects A and B in the sub image illustrated in FIG. 6A is also trimmed and enlarged such that the enlarged partial image area (enlarged image) corresponds to the main image capturing view angle.

Next, at S106, the system controller 17 causes the image processor 12 to combine the enlarged image acquired through the trimming/enlargement process at S105 with the main image (base image).

Description will be made of a method for combining the reference image corresponding to a different image capturing view angle from that of the base image with the base image. The reference images (sub images) illustrated in FIGS. 6A and 6B acquired with a wider image capturing view angle than that for acquiring the base image (main image) illustrated in FIG. 6C include the objects A and B whose sizes are different from those in the base image. Therefore, the image processor 12 at S105 trims and enlarges the area including the objects A and B in the sub image area of FIG. 6B such that the enlarged area becomes an image corresponding to an image capturing view angle equal to the main image capturing view angle to produce the enlarged image illustrated in FIG. 6D. Such a trimming/enlargement process deteriorates a resolution of the enlarged image as compared with that of the original sub image, but enables making the sizes of the objects A and B in the enlarged image equal to those in the main image. Thereafter, the image processor 12 combines, as at S104, the enlarged image as a new reference image with the base image to produce a combined image.

In this embodiment, as described above, the first sub optical systems 110a and 110b are arranged on the both sides across the sectional plane 301. With this arrangement, as illustrated in FIGS. 6A to 6C, all the object areas included in the main image acquired by the main image capturing system are included in the two sub images acquired by the two first sub image capturing systems including the first sub optical systems 110a and 110b. That is, an occlusion area that is included in the main image as the base image but is not included in either of the sub images is not generated. Accordingly, all the object areas included in the base image can be combined from at least one of the sub images acquired by the two first sub image capturing systems.

A similar effect thereto can be acquired by the arrangement of the second sub optical systems 120a and 120b on the both sides across the sectional plane 302. That is, all the object areas included in the main image acquired by the main image capturing system are included in the two sub images acquired by the two second sub image capturing systems including the second sub optical systems 120a and 120b. Accordingly, all the object areas included in the base image can be combined from at least one of the sub images acquired by the two second sub image capturing systems.

After the combined image is thus produced at S104 or S106, the system controller 17 at S107 stores the combined image to the image recording medium 16 and then ends this process.

Next, description will be made of an image capture/object distance calculation process performed by the system controller 17 and the distance calculator 19 with referring to a flowchart of FIG. 7. First, description will be made of a process in a case of using the parallax images acquired by the main and first sub image capturing systems.

The system controller 17 and the object distance calculator 19 each constituted by a computer execute the image capture/object distance calculation process according to an image capture/object distance calculation program as a computer program. In the following description, a step is abbreviated as "S".

Figure 4:
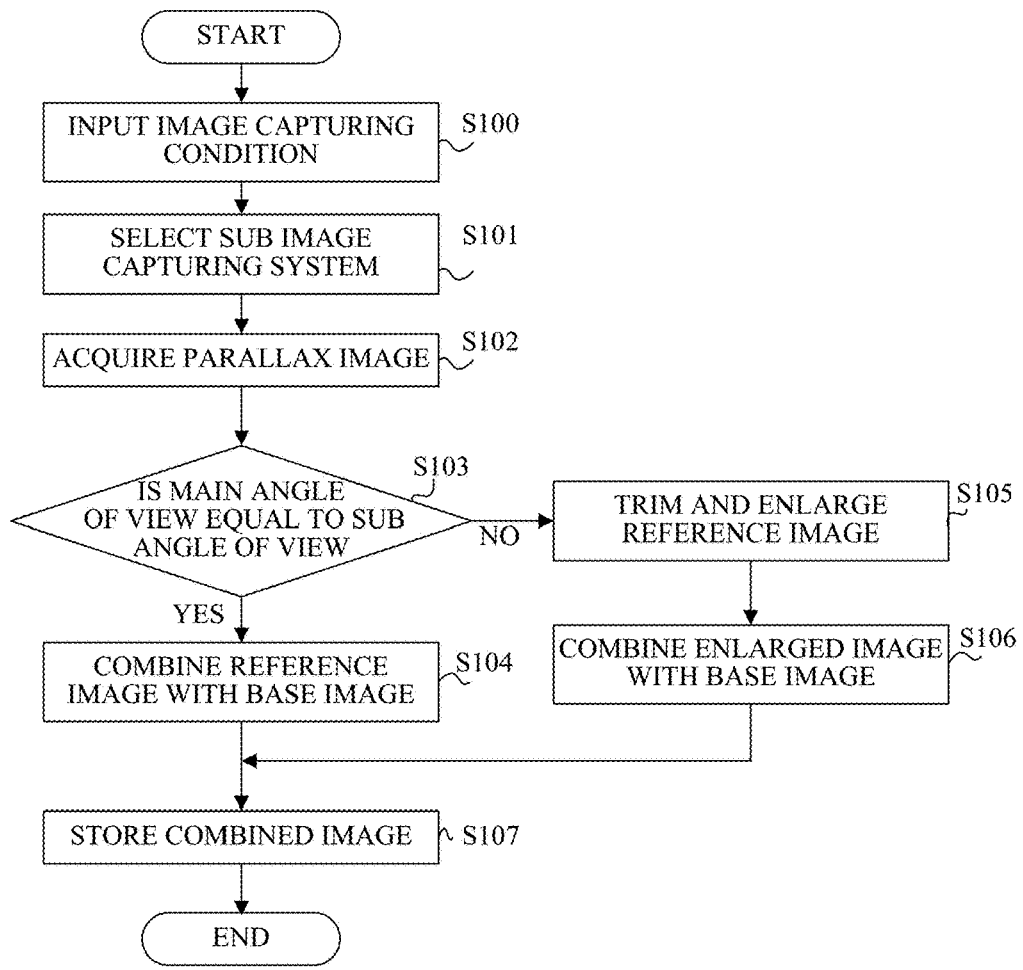
FIG. 4 is a flowchart illustrating an image capture/image combination process in Embodiment 1.

Processes at S200 to S202 are the same as those at S100 to S102 illustrated in FIG. 4, which relate to the image capture and the production of the parallax images, so that description thereof is omitted. In addition, processes at S203 and S204 are the same as those at S103 and S105 illustrated in FIG. 4, which relate to the trimming/enlargement process, so that description thereof is omitted. The system controller 17 proceeding from S203 or S204 to S205 causes the base image selector 20 to select the main image as a base image for object distance calculation. Furthermore, the system controller 17 causes the corresponding point extractor 21 to extract corresponding points between the base image and the reference images as the sub images or the enlarged images. The corresponding points are, when, for example, the base image and the reference image that are two parallax images include the object A illustrated in FIG. 13, pixels constituting the same point of the object A in the two parallax images. The corresponding point extraction method described in the image combination process is used in this process without change, so that description thereof is omitted.

Next, at S206, the system controller 17 causes the parallax amount calculator 22 to calculate parallax amounts at the respective corresponding points extracted at S205. The parallax amount is calculated as a difference between a position of each pixel (base pixel) in the base image and that of a pixel (corresponding pixel) in the reference image corresponding to the base pixel; the positions of the base pixel and the corresponding pixel were acquired by the above-described block matching method.

Next, at S207, the system controller 17 causes the distance information calculator 19 to calculate an object distance of each object included in the main image. The distance information calculator 19 calculates an object distance to each object using expression (3) using the parallax amount calculated at S206, the known focal length of the main optical system 100 and the base length between the sub optical systems 110a and 110b.

Next, at S208, the system controller 17 records information (object distance information) on the object distance calculated at S207, together with data of the parallax images acquired at S202, to the image recording medium 16 and then ends this process.

Although the above description was made of the calculation of the object distance in the case of using the first sub optical systems 110a and 110b, a similar process using the second sub optical systems 120a and 120b to the above-described process also can calculate an object distance to each object.

Description will be made of advantages of the object distance calculation using the second sub optical systems 120a and 120b having the middle focus length (middle view angle) between the wide-angle end and telephoto end of the main optical system 100. In a case where at S200 in FIG. 7 the focal length of the main optical system 100 is set to 150 mm through the information inputter 14, at S201 the second sub image capturing system having the second sub optical systems 120a and 120b whose view angles (focal lengths) are equal to that of the main optical system 100 are selected. In this case, at S201 the first sub image capturing systems whose image capturing view angles are wider than that of the main image capturing system may be selected. However, since the selection of the first sub image capturing systems has a disadvantage described later, it is desirable to select the second sub optical systems 120a and 120b whose view angles are nearest, that is, equal to (or wider than) that of the main optical system 100.

Figure 8A:
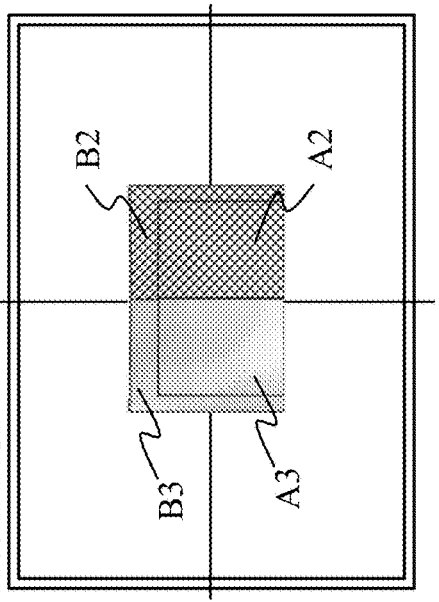
FIGS. 8A to 8D illustrate use of telephoto-side images in Embodiment 1.
Figure 8B:
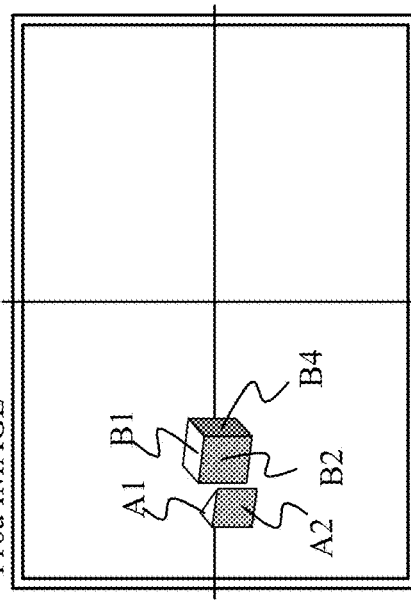
Figure 8C:
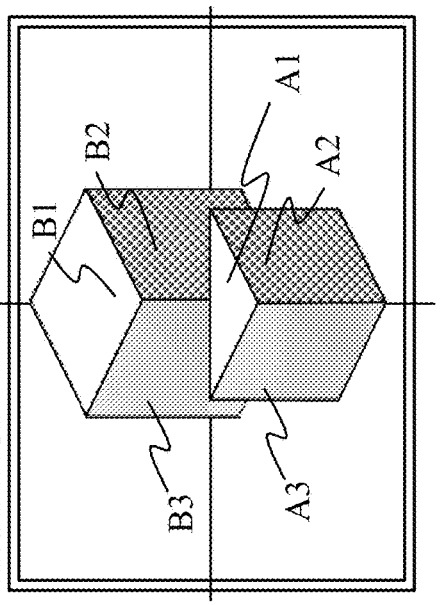
Figure 8D:
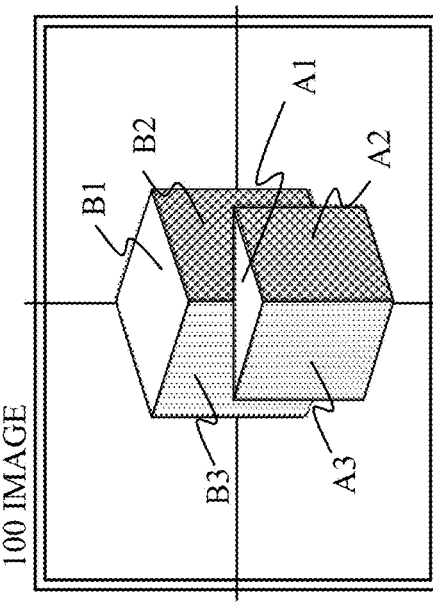

FIGS. 8A to 8C illustrate two sub images and a main image respectively acquired at S202 by image capture of the objects A and B illustrated in FIG. 13 through the two second sub image capturing systems (second sub optical systems 120a and 120b) and the main image capturing system (main optical system 100). FIG. 8D illustrates, if the two first sub image capturing systems are selected, a sub image acquired by image capture of the objects A and B through one of the first sub image capturing systems (the first sub optical system 110a).

Figure 7:
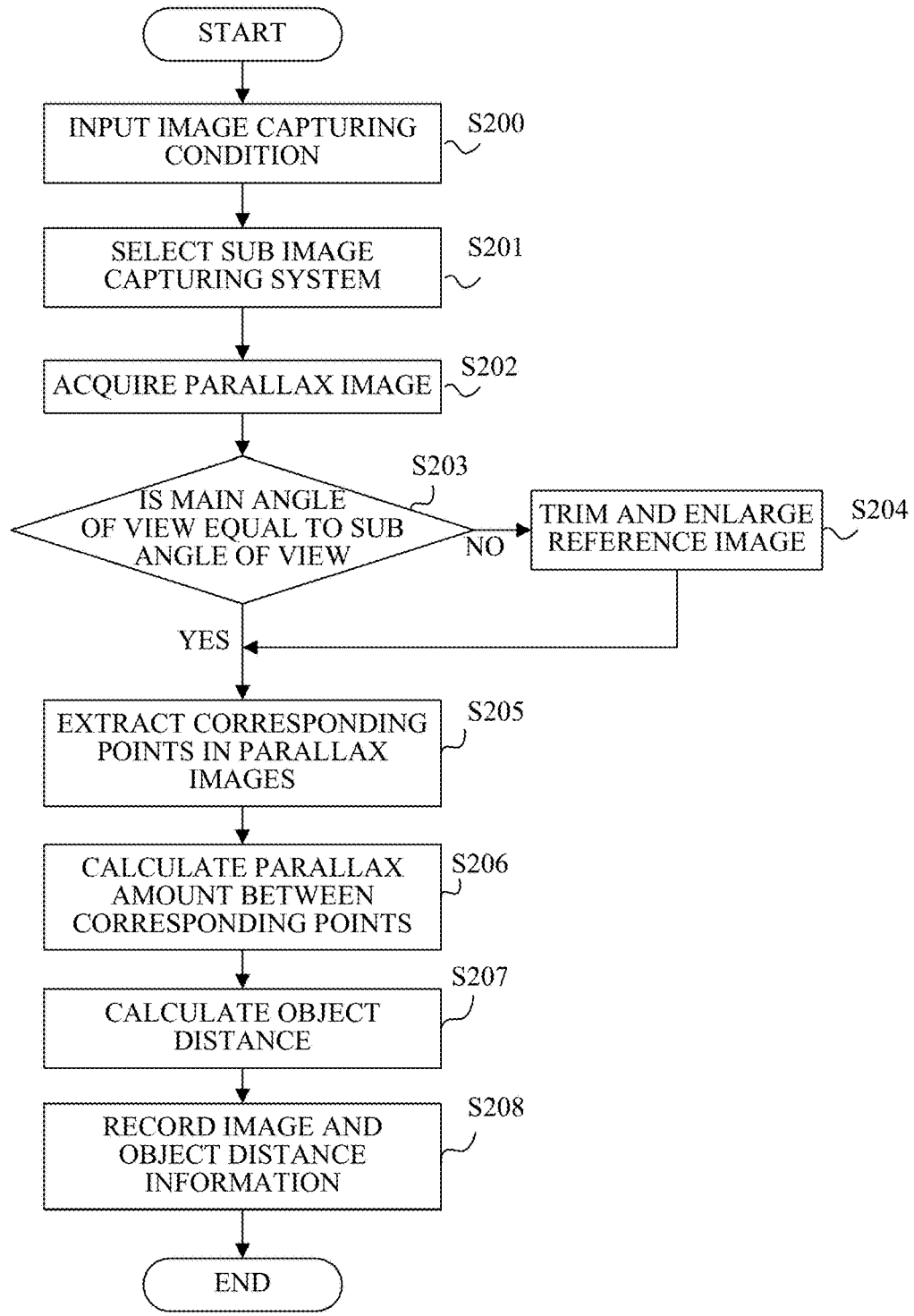
FIG. 7 is a flowchart illustrating an object distance calculation process in Embodiment 1.

As illustrated in FIGS. 8A to 8D, since the image capturing view angles of the second sub image capturing systems are equal to that of the main image capturing system, the system controller 17 proceeds from S203 in FIG. 7 to the corresponding point extraction process (S205). As described above, the two second sub optical systems 120a and 120b are arranged on the both sides across the sectional plane 302. Therefore, as illustrated in FIGS. 8A to 8C, the objects A and B included in the main image are both included in the two sub images, that is, no occlusion area is generated. Furthermore, since it is not necessary to trim and enlarge the areas of the objects A and B in the sub images acquired by the second sub image capturing systems, no resolution deterioration occurs and a good corresponding point extraction is performed, which provides a good calculation result of the parallax amounts at S206.

However, if the first sub image capturing systems are selected, as illustrated in FIG. 8D, the sizes of the objects A and B in each sub image acquired by the first sub image capturing system is significantly different from those in the main image, which makes it necessary to enlarge the area of the objects A and B in the sub image six times. Therefore, the resolution of the enlarged image is significantly deteriorated, which may cause large errors in the corresponding point extraction and the parallax amount calculation at S205 and S206. As a result, the object distance may be erroneously calculated and thereby accuracy of the AF may be deteriorated. That is, using the sub image capturing systems whose image capturing view angles are equal to or wider than the middle image capturing view angle between the wide-angle end and telephoto end of the main image capturing system enables accurately calculating the object distance over the entire image capturing view angle of the main image capturing system.

As described above, in this embodiment, the sub optical systems (110a and 110b or 120a and 120b) each constituted by a fixed focal length optical system are arranged on the both sides across the sectional plane (301 or 302) including the optical axis 100a of the main optical system 100. This arrangement enables avoiding the generation of the occlusion area over the entire image capturing view angle of the main image capturing system and thereby achieves an image capturing apparatus capable of performing a good image combination process and a good object distance calculation process.

Furthermore, the sub optical systems have the middle focal length (view angle) between the focal lengths at the wide-angle end and telephoto end of the main optical system, which enables accurately calculating the object distance over the entire image capturing view angle of the main image capturing system.

Moreover, using the configuration of this embodiment can realize various image capturing modes. For example, in a high dynamic range mode, performing image capture by the multiple sub image capturing systems under mutually different exposure conditions and combining multiple sub images acquired thereby with a main image acquired by the main image capturing system enables providing a wide dynamic range combined image. In a blur adding mode, adding blur to a background depending on the object distance calculated as described above enables producing an image in which a main object is highlighted. In a background removing mode, using the object distance calculated as described above enables producing an image in which a background other than a main object is removed. In a stereo image capturing mode, acquiring right and left parallax images by the main and sub image capturing systems horizontally arranged enables producing a stereoscopically viewable image by using one of the parallax images corresponding to a narrow view angle and part of the other one thereof corresponding to a wide view angle.

Although this embodiment described the case where the sub image capturing systems are each a fixed focal length optical system, the sub image capturing systems may be each a magnification variable (variable focal length) optical system.

Embodiment 2

Figure 9:
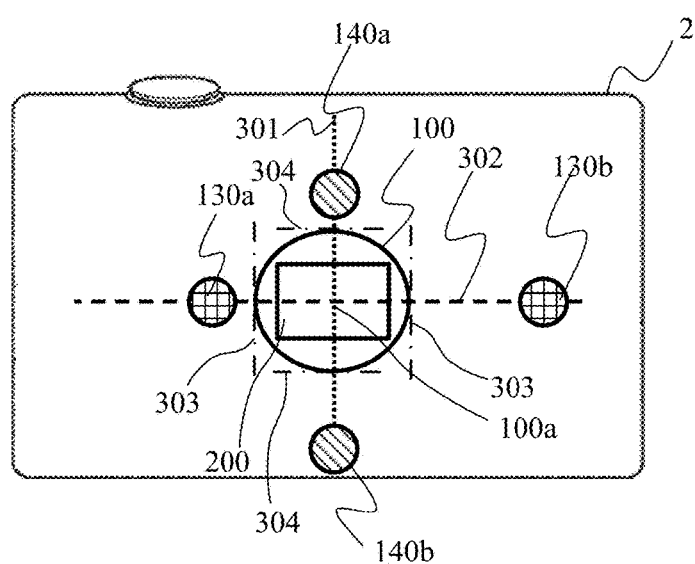
FIG. 9 is a front view of an image capturing apparatus that is Embodiment 2 of the present invention.

Next, description will be made of a second embodiment (Embodiment 2) of the present invention. FIG. 9 illustrates an image capturing apparatus 2 of this embodiment, which is viewed from an object side.

A main optical system 100 is, as that in Embodiment 1, a magnification variable imaging optical system having a variable focal length (35 mm-equivalent focal length) from 24 mm to 300 mm. A main image sensor 200 has a rectangular image capturing area corresponding to the main optical system 100 and captures an object image formed by the main optical system 100. The main optical system 100 and the main image sensor 200 constitute a main image capturing system.

Four sub optical systems 130a, 130b, 140a and 140b are each a fixed focal length imaging optical system. Four sub image sensors (not illustrated) capture object images respectively formed by the four sub optical systems 130a, 130b, 140a and 140b. Each sub optical system and the sub image sensor corresponding thereto constitute a sub image capturing system. That is, the mage capturing apparatus 2 of this embodiment has four sub image capturing systems. The four sub image capturing systems includes two first sub image capturing systems respectively constituted by the sub optical systems 130a and 130b and the sub image sensors corresponding thereto and two second sub image capturing systems respectively constituted by the sub optical systems 140a and 140b and the sub image sensors corresponding thereto. The main optical system 100 and the four sub optical systems 130a, 130b, 140a and 140b are arranged such that optical axes thereof are parallel to one another. The sub optical systems (each hereinafter referred to as "a first sub optical system") 130a and 130b are each a fixed focal length optical system having a focal length equal to a 35 mm-equivalent focal length of 24 mm (that is, having a view angle equal to that) of the main optical system 100 at its wide-angle end. On the other hand, the sub optical systems (each hereinafter referred to as "a second sub optical system") 140a and 140b are each a fixed focal length optical system having a focal length equal to a middle focal length of the main optical system 100 at its middle zoom position between its wide-angle end and telephoto end. That is, each of the second sub optical systems 140a and 140b has a view angle narrower than that of the main optical system 100 at the wide-angle end and wider than that of the main optical system 100 at the telephoto end. For example, each of the second sub optical systems 140a and 140b has a 35 mm-equivalent focal length of 100 mm. The first sub optical systems 130a and 130b are arranged on both sides across a sectional plane (straight line) 301 including the optical axis 100a of the main optical system 100 and in areas further outside than the main optical system 100 (that is, further outside than two lines 303) in a horizontal direction orthogonal to the sectional plane 301. The sectional plane 301 includes midpoints of two long sides of the rectangular image capturing area of the main image sensor 200 and the optical axis 100a of the main optical system 100. Arranging the first sub optical systems 130a and 130b as described above enables avoiding generation of the above-described occlusion area over an entire horizontal area of a captured image acquired through the main optical system 100 (that is, over an entire horizontal image capturing view angle of the main image capturing system).

The second sub optical systems 140a and 140b are arranged on both sides across a sectional plane (straight line) 302 including the optical axis 100a of the main optical system 100 and in areas further outside than the main optical system 100 (that is, further outside than two lines 304) in a vertical direction orthogonal to the sectional plane 302.

The sectional plane 302 includes midpoints of two short sides of the rectangular image capturing area of the main image sensor 200 and the optical axis 100a of the main optical system 100. Arranging the second sub optical systems 140a and 140b as described above enables avoiding generation of the above-described occlusion area over an entire vertical area of the captured image acquired through the main optical system 100 (that is, over an entire vertical image capturing view angle of the main image capturing system).

Also in this embodiment, avoiding the generation of the occlusion area enables successfully performing an image combination process and an object distance calculation process over the entire horizontal and vertical image capturing view angles of the main image capturing system. In FIG. 9, the optical axes of the first sub optical systems 130a and 130b and the optical axis 100a of the main optical system 100 are located on the identical straight line 302. Furthermore, the optical axes of the second sub optical systems 140a and 140b and the optical axis 100a of the main optical system 100 are located on the identical straight line 301.

The above-described configuration is identical to that of Embodiment 1. However, in this embodiment, an inter-optical axis distance (base length) between the optical axis of the first sub optical system 130a and the optical axis 100a of the main optical system 100 is different from that between the optical axis of the first sub optical system 130b and the optical axis 100a of the main optical system 100. Similarly, an inter-optical axis distance (base length) between the optical axis of the second sub optical system 140a and the optical axis 100a of the main optical system 100 is different from that between the optical axis of the second sub optical system 140b and the optical axis 100a of the main optical system 100.

More specifically, the first sub optical system 130a and the second sub optical system 140a are arranged near the main optical system 100, and on the other hand, the first sub optical system 130b and the second sub optical system 140b are disposed away from the main optical system 100.

Figure 10C:
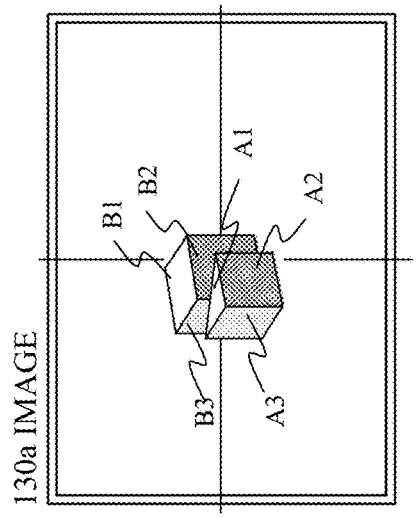
FIGS. 10A to 10C illustrate captured images acquired by the image capturing apparatus of Embodiment 2.
Figure 10B:
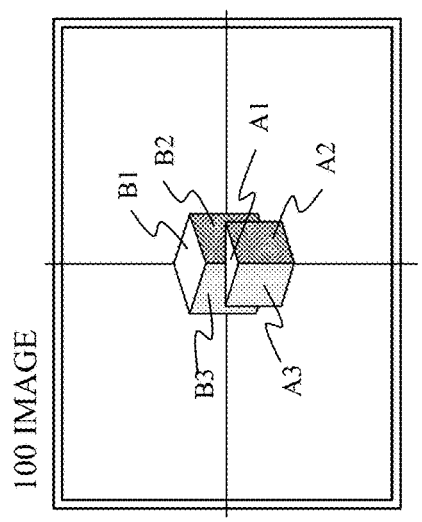
Figure 10A:
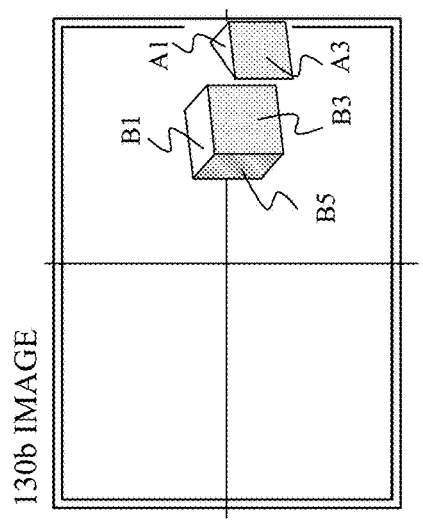

Description will be made of an effect of such an arrangement of the sub optical systems with the different inter-optical axis distances with referring to FIGS. 10A to 10C. FIG. 10B illustrates a main image acquired by image capture of the objects A and B illustrated in FIG. 13 through the main image capturing system in which the view angle of the main optical system 100 is set to one at the wide-angle end. FIGS. 10A and 10C illustrate sub images acquired by image capture of the objects A and B illustrated in FIG. 13 through the sub image capturing system including the first sub optical system 130b and the sub image capturing system including the first sub optical system 130a.

When object distances that are distances to the objects A and B are short (near), a long base length between the main optical system 100 and the first sub optical system 130b excessively increases a parallax amount as illustrated in FIG. 10A, which causes the object A to be protruded outside the image capturing view angle. If the entire object A is not included in the sub image (reference image) acquired by the sub image capturing system, the above-mentioned corresponding point extraction process cannot be performed, thereby making it impossible to calculate the object distance.

However, in this embodiment, providing the first sub optical system 130a near the main optical system 100 and thereby shortening the base length therebetween enables reducing the parallax amount even when the object distance is short. Therefore, this embodiment enables, as illustrated in FIG. 10C, causing the sub image acquired by the first sub image capturing system including the first sub optical system 130a to include the entire objects A and B. Accordingly, when capturing a close distance object, using the main image acquired by the main image capturing system and the sub image acquired by the first sub image capturing system including the first sub optical system 130a enables calculating object distances over the entire image capturing view angle of the main image capturing system.

On the other hand, when the object distances to the objects A and B are long (far), a short base length between the main optical system 100 and the first sub optical system 130a excessively decreases the parallax amount, which deteriorates accuracy of the object distance calculation.

However, in this embodiment, providing the first sub optical system 130b away from the main optical system 100 and thereby lengthening the base length therebetween enables increasing the parallax amount even when the object distance is long. Accordingly, when capturing a far-distance object, using the main image acquired by the main image capturing system and the sub image acquired by the first sub image capturing system including the first sub optical system 130b enables accurately calculating object distances.

As described above, in this embodiment, the multiple sub optical systems 130a, 130b, 140a and 140b are arranged such that the inter-optical axis distance between at least one of the sub optical systems 130a, 130b, 140a and 140b and the main optical system 100 is different from that between at least another one thereof and the main optical system 100. This arrangement enables providing accurate object distance information in a wide object distance range.

Embodiment 3

Figure 11:
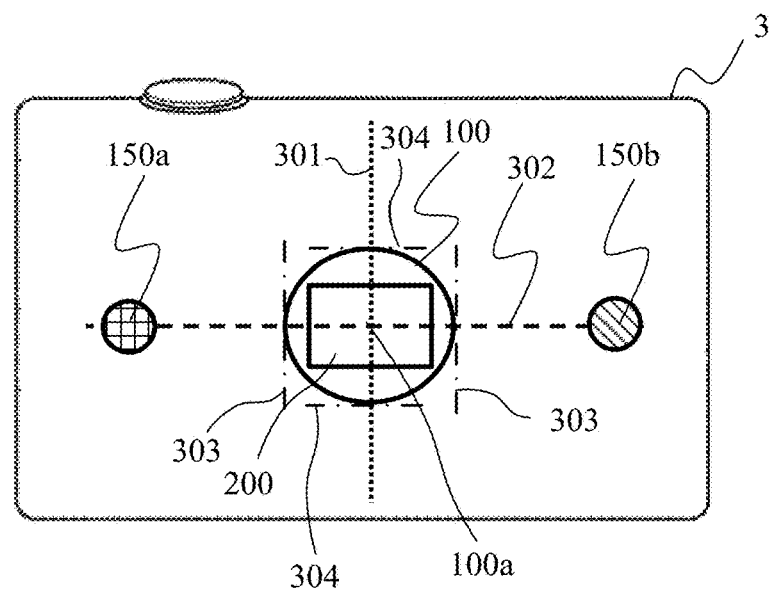
FIG. 11 is a front view of an image capturing apparatus that is Embodiment 3 of the present invention.

Next, description will be made of a third embodiment (Embodiment 3) of the present invention. FIG. 11 illustrates an image capturing apparatus 3 of this embodiment, which is viewed from an object side. A main optical system 100 is, as those in Embodiments 1 and 2, a magnification variable imaging optical system having a variable focal length (35 mm-equivalent focal length) from 24 mm to 300 mm. A main image sensor 200 has a rectangular image capturing area corresponding to the main optical system 100 and captures an object image formed by the main optical system 100. The main optical system 100 and the main image sensor 200 constitute a main image capturing system.

Two sub optical systems 150a and 150b are each a fixed focal length imaging optical system.

Two sub image sensors (not illustrated) capture object images respectively formed by the two sub optical systems 150a and 150b. Each sub optical system and the sub image sensor corresponding thereto constitute a sub image capturing system. That is, the image capturing apparatus 3 of this embodiment has two sub image capturing systems. The main optical system 100 and the two sub optical systems 150a and 150b are arranged such that optical axes thereof are parallel to one another. The sub optical system 150a is a fixed focal length optical system having a 35 mm-equivalent focal length of 20 mm, which is shorter (that is, having a view angle wider) than a 35 mm-equivalent focal length of 24 mm of the main optical system 100 at its wide-angle end. On the other hand, the sub optical system 150b is a fixed focal length optical system having a focal length equal to a focal length of the main optical system 100 at a middle zoom position between its wide-angle end and telephoto end. That is, the sub optical system 150b has a view angle narrower than that of the main optical system 100 at the wide-angle end and wider than that of the main optical system 100 at the telephoto end. For example, the sub optical system 150b has a 35 mm-equivalent focal length of 100 mm.

The sub optical systems 150a and 150b are arranged on both sides across a sectional plane (straight line) 301 including the optical axis 100a of the main optical system 100 and in areas further outside than the main optical system 100 (that is, further outside than two lines 303) in a horizontal direction orthogonal to the sectional plane 301. The sectional plane 301 includes midpoints of two long sides of the rectangular image capturing area of the main image sensor 200 and the optical axis 100a of the main optical system 100. Arranging the sub optical systems 150a and 150b as described above enables avoiding generation of the above-described occlusion area over an entire horizontal area of a captured image acquired through the main optical system 100 (that is, over an entire horizontal image capturing view angle of the main image capturing system).

In FIG. 11, the optical axes of the sub optical systems 150a and 150b and the optical axis 100a of the main optical system 100 are located on an identical straight line 302.

This embodiment is different from Embodiments 1 and 2 in that part of the sub optical systems has a wider image capturing view angle than that of the main image capturing system at its wide-angle end. Thus, this embodiment enables a user to observe a wider object range through the sub image capturing system than that through the main image capturing system, which enables utilizing the sub image capturing system for following a moving object and for setting an appropriate image capturing view angle of the main image capturing system.

Furthermore, in this embodiment, the two sub image capturing systems have mutually different focal lengths (image capturing view angles). Therefore, only when the view angle of the main optical system 100 is set narrower than that (focal length 100 mm) of the sub optical system 150b, the generation of the occlusion area can be avoided over the entire image capturing view angle of the main image capturing system. Specifically, a partial image area of a sub image acquired by the sub image capturing system including the sub optical system 150a is trimmed and enlarged such that a size of an object becomes equal to that included in a sub image acquired by the sub image capturing system including the sub optical system 150b.

Thereafter, subsequent processes can be performed as in Embodiment 1. In this embodiment, as in Embodiment 1, having the sub optical system 150b whose focal length is equal to the middle focal length of the main optical system 100 between its wide-angle end and telephoto end enables, irrespective of a reduced total number of the sub image capturing systems, accurately calculating object distances by using a telephoto side image capturing view angle of the main image capturing system.

Embodiment 4

Figure 12:
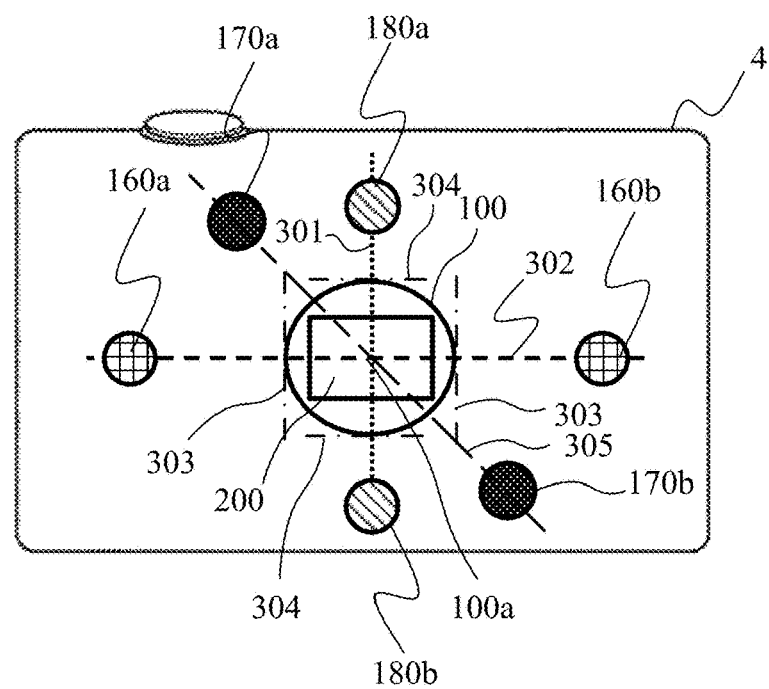
FIG. 12 is a front view of an image capturing apparatus that is Embodiment 4 of the present invention.

Next, description will be made of a fourth embodiment (Embodiment 4) of the present invention. FIG. 12 illustrates an image capturing apparatus 4 of this embodiment, which is viewed from an object side. A main optical system 100 is, as those in Embodiments 1 to 3, a magnification variable imaging optical system having a variable focal length (35 mm-equivalent focal length) from 24 mm to 300 mm. A main image sensor 200 has a rectangular image capturing area corresponding to the main optical system 100 and captures an object image formed by the main optical system 100. The main optical system 100 and the main image sensor 200 constitute a main image capturing system.

Six sub optical systems 160a, 160b, 170a, 170b, 180a and 180b are each a fixed focal length imaging optical system.

Six sub image sensors (not illustrated) capture object images respectively formed by the six sub optical systems 160a, 160b, 170a, 170b, 180a and 180b. Each sub optical system and the sub image sensor corresponding thereto constitute a sub image capturing system. That is, the mage capturing apparatus 4 of this embodiment has six sub image capturing systems. The six sub image capturing systems includes two first sub image capturing systems respectively constituted by the sub optical systems 160a and 160b and the sub image sensors corresponding thereto and four second sub image capturing systems respectively constituted by the sub optical systems 170a, 170b, 180a and 180b and the sub image sensors corresponding thereto.

In the following description, the two sub image capturing systems including the sub optical systems 170a and 170b is referred to as "second sub image capturing systems", and the two sub image capturing systems including the sub optical systems 180a and 180b is referred to as "third sub image capturing systems".

The main optical system 100 and the six sub optical systems 160a, 160b, 170a, 170b, 180a and 180b are arranged such that optical axes thereof are parallel to one another. The sub optical systems (each hereinafter referred to as "a first sub optical system") 160a and 160b are each a fixed focal length optical system having a focal length equal to a 35 mm-equivalent focal length of 24 mm (that is, having a view angle equal to that) of the main optical system 100 at its wide-angle end. On the other hand, the sub optical systems (each hereinafter referred to as "a second sub optical system") 170a and 170b are each a fixed focal length optical system having a focal length equal to a middle focal length of the main optical system 100 at its middle zoom position between its wide-angle end and telephoto end. That is, each of the second sub optical systems 170a and 170b has a view angle narrower than that of the main optical system 100 at the wide-angle end and wider than that of the main optical system 100 at the telephoto end. For example, each of the second sub optical systems 170a and 170b has a 35 mm-equivalent focal length of 100 mm. Furthermore, the sub optical systems (each hereinafter referred to as "a third optical system") 180a and 180b are each a fixed focal length optical system having a focal length equal to another middle focal length of the main optical system 100 at its another middle zoom position between the wide-angle end and telephoto end. That is, each of the second sub optical systems 170a and 170b has a view angle narrower than that of the main optical system 100 at the wide-angle end and wider than that of the main optical system 100 at the telephoto end. For example, each of the second sub optical systems 180a and 180b has a 35 mm-equivalent focal length of 200 mm. The first sub optical systems 160a and 160b are arranged on both sides across a sectional plane (straight line) 301 including the optical axis 100a of the main optical system 100 and in areas further outside than the main optical system 100 (that is, further outside than two lines 303) in a horizontal direction orthogonal to the sectional plane 301. The sectional plane 301 includes midpoints of two long sides of the rectangular image capturing area of the main image sensor 200 and the optical axis 100a of the main optical system 100. Arranging the first sub optical systems 160a and 160b as described above enables avoiding generation of the above-described occlusion area over an entire horizontal area of a captured image acquired through the main optical system 100 (that is, over an entire horizontal image capturing view angle of the main image capturing system).

The second and third sub optical systems 170a, 170b, 180a and 180b are arranged on both sides across a sectional plane (straight line) 302 including the optical axis 100a of the main optical system 100 and in areas further outside than the main optical system 100 (that is, further outside than two lines 304) in a vertical direction orthogonal to the sectional plane 302. The sectional plane 302 includes midpoints of two short sides of the rectangular image capturing area of the main image sensor 200 and the optical axis 100a of the main optical system 100. Arranging the second and third optical systems 170a, 170b, 180a and 180b as described above enables avoiding generation of the above-described occlusion area over an entire vertical area of the captured image acquired through the main optical system 100 (that is, over an entire vertical image capturing view angle of the main image capturing system).

In FIG. 12, the optical axes of the first sub optical systems 160a and 160b and the optical axis 100a of the main optical system 100 are located on the identical straight line 302. Furthermore, the optical axes of the third sub optical systems 180a and 180b and the optical axis 100a of the main optical system 100 are located on the identical straight line 301.

On the other hand, the optical axes of the second sub optical systems 170a and 170b are not located on the straight lines 301 and 302, but are located on a straight line 305 tilted with respect to the straight lines 301 and 302.

This embodiment has the sub image capturing systems having two image capturing view angles between the wide-angle end and telephoto end of the main image capturing system (the sub image capturing systems are hereinafter referred to as "two types of sub image capturing systems"). Having such two types of image capturing systems enables reducing an enlargement rate in trimming and enlarging a partial image area of a sub image acquired by any of the two types of sub image capturing systems. Therefore, this embodiment enables reducing resolution deterioration and thereby enables providing more accurate object distance information.

Each of the above-described embodiments enables avoiding disadvantages due to the generation of the occlusion area over the entire image capturing view angle of the main image capturing system.

In other words, each embodiment achieves an image capturing apparatus capable of acquiring accurate object distance information over the entire image capturing view angle of the main image capturing system and of successfully combining multiple images acquired by the main and multiple sub image capturing systems with one another.

Although the above embodiments described the case where the main and multiple image capturing systems include separate image sensors (main and multiple sub image sensors), a single image sensor may be used that has a main image capturing area provided for the main image capturing system and multiple image capturing areas provided for the multiple sub image capturing systems.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-147640, filed on Jul. 27, 2015, which is hereby incorporated by reference herein in its entirety.

What is claimed is:

1. An image capturing apparatus comprising:
a main image capturing system configured to capture an object image formed by a main optical system, the main optical system being a zoom lens; and
multiple sub image capturing systems configured to respectively capture multiple object images respectively formed by multiple sub optical systems,
wherein the multiple sub optical systems are arranged on both sides across a sectional plane including an optical axis of the main optical system,
wherein at least one sub optical system included in the multiple sub optical systems is a fixed focal length optical system whose view angle is equal to or wider than that of the main optical system at its wide-angle end,
wherein at least one other sub optical system included in the multiple sub optical systems is a fixed focal length optical system whose view angle is smaller than that of the main optical system at its wide-angle end and is equal to or wider than that of the main optical system at its telephoto end, and
wherein the apparatus further comprises a processor configured to acquire, using a main image produced by the main image capturing system and multiple sub images produced by the multiple sub image capturing systems, object distance information in an image capturing view angle of the main image capturing system.

2. The image capturing apparatus according to claim 1, wherein the multiple sub optical systems are arranged on the both sides across the sectional plane and in areas further outside than the main optical system in a direction orthogonal to the sectional plane.

3. The image capturing apparatus according to claim 1, wherein each of the sub optical systems is a fixed focal length optical system.

4. The image capturing apparatus according to claim 1, wherein the multiple sub optical systems include:
at least two first sub optical systems each being a fixed focal length optical system whose view angle is equal to or wider than that of the main optical system at its wide-angle end; and
at least two second sub optical systems each being a fixed focal length optical system whose view angle is smaller than that of the main optical system at its wide-angle end and is equal to or wider than that of the main optical system at its telephoto end.

5. The image capturing apparatus according to claim 1, wherein an inter-optical axis distance between at least one of the multiple sub optical systems and the main optical system is different from that between at least another one of the sub optical systems and the main optical system.

6. The image capturing apparatus according to claim 1, wherein optical axes of at least two of the multiple sub optical systems and the optical axis of the main optical system are located on an identical straight line.

7. The image capturing apparatus according to claim 1, further comprising a selector configured to select from the multiple sub image capturing systems, depending on a view angle of the main optical system, at least one sub image capturing system used for acquiring the object distance information.

8. The image capturing apparatus according to claim 7, wherein the processor is configured to, when the image capturing view angle of the main image capturing system is different from that of the selected sub image capturing system in acquiring the object distance information, acquire the object distance information using an enlarged image obtained by trimming and enlarging an image area corresponding to the image capturing view angle from the sub image produced by the selected sub image capturing system.

\* \* \* \* \*